US012650098B2

(12) United States Patent　　　　(10) Patent No.:　US 12,650,098 B2
Dorsamy et al.　　　　　　　　　　　(45) Date of Patent:　　　Jun. 9, 2026

(54) AIRCRAFT ENGINE EXHAUST MIXER HAVING STIFFENED PORTIONS FOR ATTENUATING VIBRATION

(71) Applicant: PRATT & WHITNEY CANADA CORP., Longueuil (CA)

(72) Inventors: Yashiva Dorsamy, St-Hubert (CA); Domenico Di Florio, St-Lazare (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/151,715

(22) Filed: Jan. 9, 2023

(65) Prior Publication Data

US 2024/0229738 A1　　　Jul. 11, 2024

(51) Int. Cl.
　　*F02K 1/48*　　　　(2006.01)
　　*F02K 1/38*　　　　(2006.01)
(52) U.S. Cl.
　　CPC .............. *F02K 1/48* (2013.01); *F02K 1/386* (2013.01); *F05D 2300/506* (2013.01)
(58) Field of Classification Search
　　CPC ... F02K 1/48; F02K 1/386; F02K 1/46; Y10S 239/12
　　USPC .......... 239/436, 533.1, 533.13, 587.1, 587.2, 239/588, 602, DIG. 12; 417/195, 198; 188/378
　　See application file for complete search history.

(56) References Cited

U.S. PATENT DOCUMENTS 591,067　A　* 　10/1897　Wallace .................. F04F 10/00
　　　　　　　　　　　　　　　　　　　　137/142
3,007,304　A　　11/1961　Wotton et al.

3,092,205　A　* 　6/1963　Urmston ................... F02K 1/40
　　　　　　　　　　　　　　　　　　　　181/213
3,415,337　A　* 　12/1968　Karasievich ............ F01D 25/30
　　　　　　　　　　　　　　　　　　　　181/220
4,052,847　A　* 　10/1977　Rodgers .................. F02K 1/386
　　　　　　　　　　　　　　　　　　　　239/265.17
4,226,085　A　* 　10/1980　Johnson .................. F02K 1/386
　　　　　　　　　　　　　　　　　　　　60/264
4,401,269　A　* 　8/1983　Eiler ......................... F02K 1/48
　　　　　　　　　　　　　　　　　　　　239/265.17

(Continued)

FOREIGN PATENT DOCUMENTS

EP　　　　1703114　　　9/2006
EP　　　　3564515　　　11/2019
GB　　　　889688　　　2/1962

*Primary Examiner* — Devon C Kramer
*Assistant Examiner* — Henry Ng
(74) *Attorney, Agent, or Firm* — NORTON ROSE FULBRIGHT CANADA LLP

(57)　　　　　　ABSTRACT

An aircraft engine including a core casing extending circumferentially about an axis and defining a core flow passage, a nacelle located radially outward from and around the casing, and a bypass passage defined between the nacelle and the casing. A mixer includes a peripheral wall having a leading edge and a trailing edge, the leading edge attached to the casing. A first mixer portion and a second mixer portion are circumferentially spaced apart and respectively extend away from the leading edge from a first location to a second location. The first and second mixer portions respectively have a first and second stiffness, the first stiffness greater than the second stiffness and greater than a stiffness of an upstream portion of the wall extending from the first mixer portion at the first location toward the leading edge.

13 Claims, 5 Drawing Sheets

(56)          References Cited

U.S. PATENT DOCUMENTS

| | | | | | |
|---|---|---|---|---|---|
| 4,635,882 | A | * | 1/1987 | SenGupta | B64C 1/40 |
| | | | | | 244/119 |
| 4,850,535 | A | * | 7/1989 | Ivie | A63H 27/02 |
| | | | | | 239/602 |
| 5,088,775 | A | | 2/1992 | Corsmeier et al. | |
| 5,127,602 | A | * | 7/1992 | Batey | F02K 1/827 |
| | | | | | D12/345 |
| 6,877,960 | B1 | * | 4/2005 | Presz, Jr. | F04F 5/46 |
| | | | | | 417/183 |
| 8,739,513 | B2 | | 6/2014 | Lefebvre et al. | |
| 10,082,043 | B2 | | 9/2018 | Lefebvre et al. | |
| 10,190,536 | B2 | | 1/2019 | Durocher et al. | |
| 10,619,596 | B2 | | 4/2020 | Di Paola et al. | |
| 2003/0222160 | A1 | * | 12/2003 | Gordon | B05C 5/0216 |
| | | | | | 239/533.13 |
| 2008/0115484 | A1 | | 5/2008 | Conete et al. | |
| 2011/0036068 | A1 | | 2/2011 | Lefebvre et al. | |
| 2014/0241863 | A1 | * | 8/2014 | Tardif | F02K 1/80 |
| | | | | | 415/145 |
| 2015/0337761 | A1 | | 11/2015 | Marini et al. | |
| 2016/0032864 | A1 | | 2/2016 | Di Paola et al. | |
| 2017/0058700 | A1 | | 3/2017 | Heffernan et al. | |
| 2018/0135556 | A1 | * | 5/2018 | Todorovic | F02K 1/48 |
| 2019/0338725 | A1 | | 11/2019 | Pargny et al. | |
| 2020/0166004 | A1 | * | 5/2020 | Farah | F01D 25/162 |

* cited by examiner

_FIG_.1

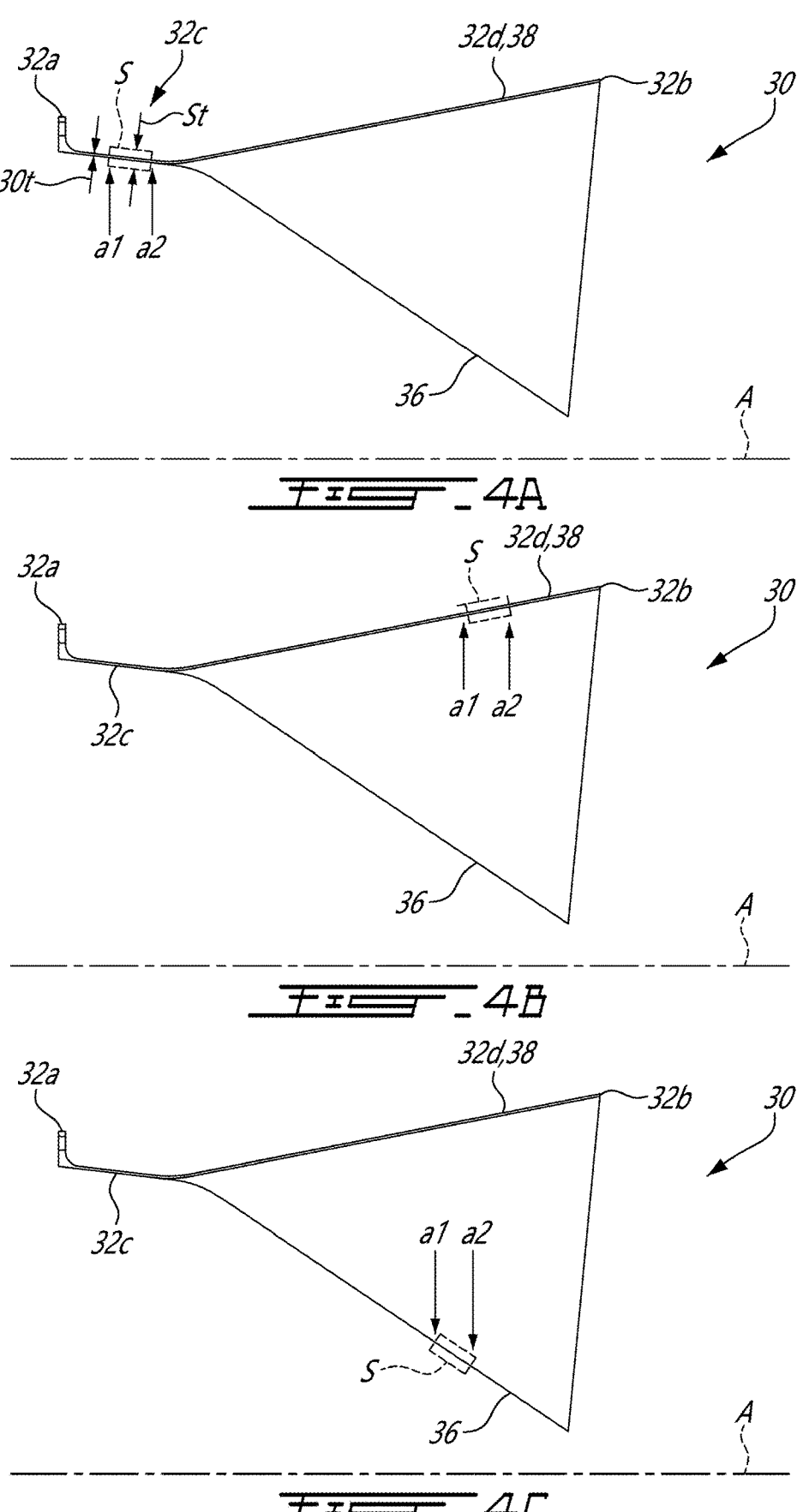

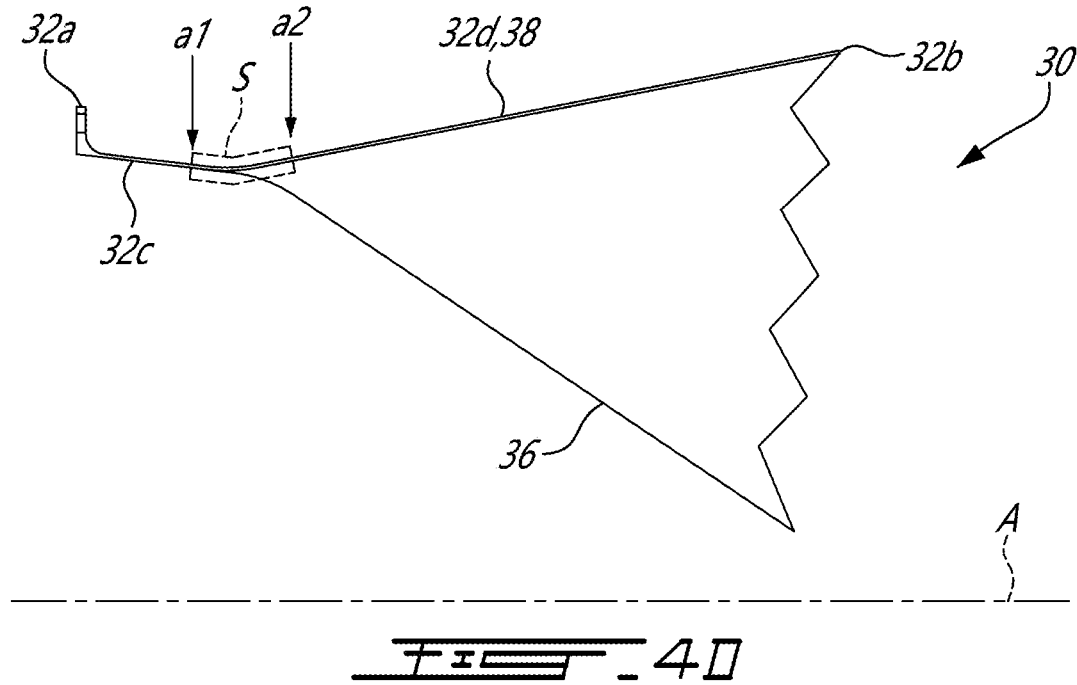
_FIG_ 4D
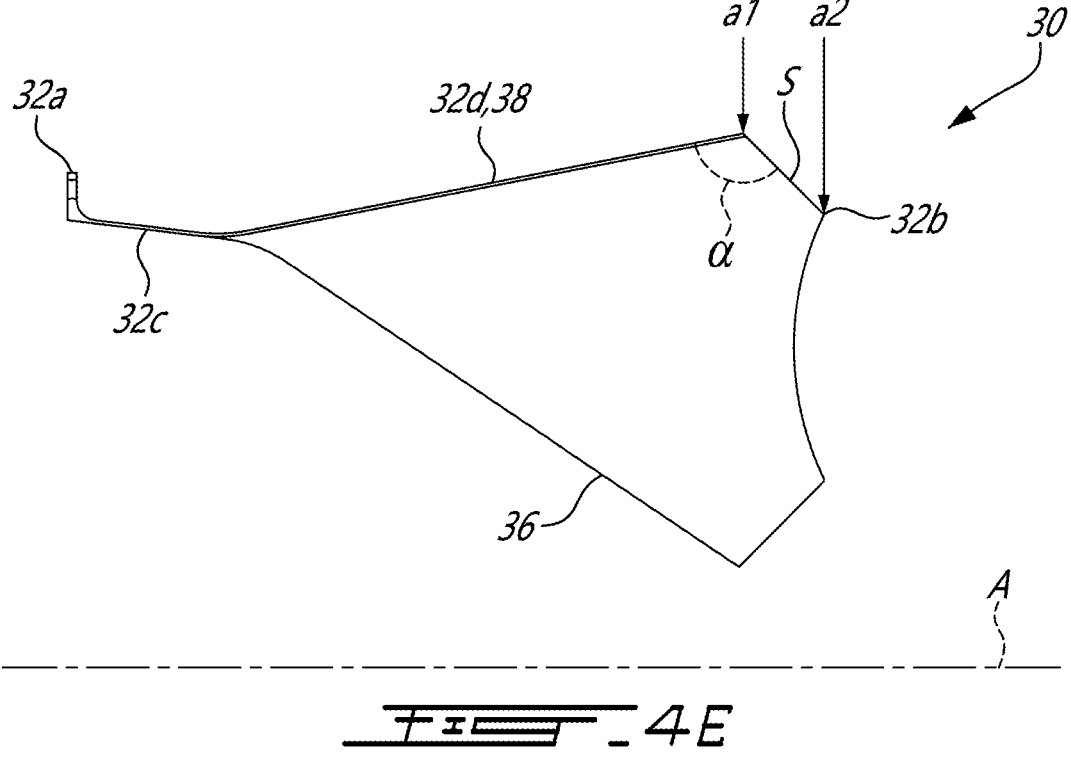
_FIG_ 4E

AIRCRAFT ENGINE EXHAUST MIXER HAVING STIFFENED PORTIONS FOR ATTENUATING VIBRATION

TECHNICAL FIELD

The disclosure relates generally to aircraft engines and, more particularly, to exhaust mixers for such engines.

BACKGROUND

Many modern aircraft engines, such as gas turbine engines of the turbofan type, are designed so as to harness the exhaust flows outputted by the engine. In the case of turbofan engines, this may include for example a colder, slower bypass flow and a hotter, faster core engine exhaust flow which meet and are exhausted together at the exit of the engine. Exhaust mixers provide an interface between the bypass flow and the core engine exhaust flow, which route the flows such that they ultimately interact as desired before they exit through a common nozzle.

Exhaust mixers can generally be said to fall into one of two general categories. Annular mixers typically include an annular rear edge separating the bypass and exhaust flows. The bypass and exhaust flows are brought together annularly downstream of the annular edge, and mixing is achieved by shearing between the flows. Such annular mixers typically offer the benefit of a low pressure loss. Forced mixers involve intertwining hot and cold airflows, typically in the form of circumferentially disposed mixer lobes that alternately extend radially outward to outer vertices (crests) of the mixer and radially inward to inner vertices (valleys) of the mixer to create a circumferentially alternating sequence of hot and cold flow streams. Such forced mixers typically offer the benefit of a mixing efficiency that is greater than that of annular mixers, but may be associated with higher pressure losses.

SUMMARY

In one aspect of the present technology, there is provided an aircraft engine comprising: an engine casing housing a core of the aircraft engine, the engine casing extending circumferentially about an axis of the aircraft engine and defining a core flow passage therewithin; a nacelle located radially outward from and circumferentially around the engine casing, a bypass flow passage radially defined between the nacelle and the engine casing; a mixer mounted to the engine casing, the mixer including a peripheral wall having a leading edge and a trailing edge axially spaced from one another and extending around the axis, the leading edge attached to the engine casing, wherein a first mixer portion and a second mixer portion are circumferentially spaced apart and respectively extend away from the leading edge from a first axial location to a second axial location, the first and second mixer portions respectively have a first mixer stiffness and a second mixer stiffness, the first mixer stiffness being greater than the second mixer stiffness and greater than a stiffness of an upstream portion of the peripheral wall extending from the first mixer portion at the first axial location toward the leading edge.

In another aspect of the present technology, there is provided an exhaust mixer for an aircraft engine, the exhaust mixer comprising: a leading edge attachable to an engine casing of the aircraft engine, the leading edge extending annularly around an axis, a trailing edge spaced axially from the leading edge and surrounding the axis, and a peripheral wall extending axially from the leading edge to the trailing edge, the peripheral wall defining a plurality of lobes that are circumferentially spaced apart, a first mixer portion of the exhaust mixer being rotationally asymmetrical about the axis relative to a second mixer portion of the exhaust mixer, the first mixer portion and the second mixer portion respectively including a first lobe portion of a first lobe of the plurality of lobes and a second lobe portion of a second lobe of the plurality lobes, the first and second lobe portions located at a same radial distance relative to the axis, a discontinuity defined in the peripheral wall imparting a first stiffness to the first mixer portion, the first stiffness being greater than a second stiffness of the second mixer portion.

BRIEF DESCRIPTION OF THE DRAWINGS

Reference is now made to the accompanying figures in which:

FIGS. 4A-4E are cross-sectional views of exhaust mixers according to embodiments.

DETAILED DESCRIPTION

Figure 1:
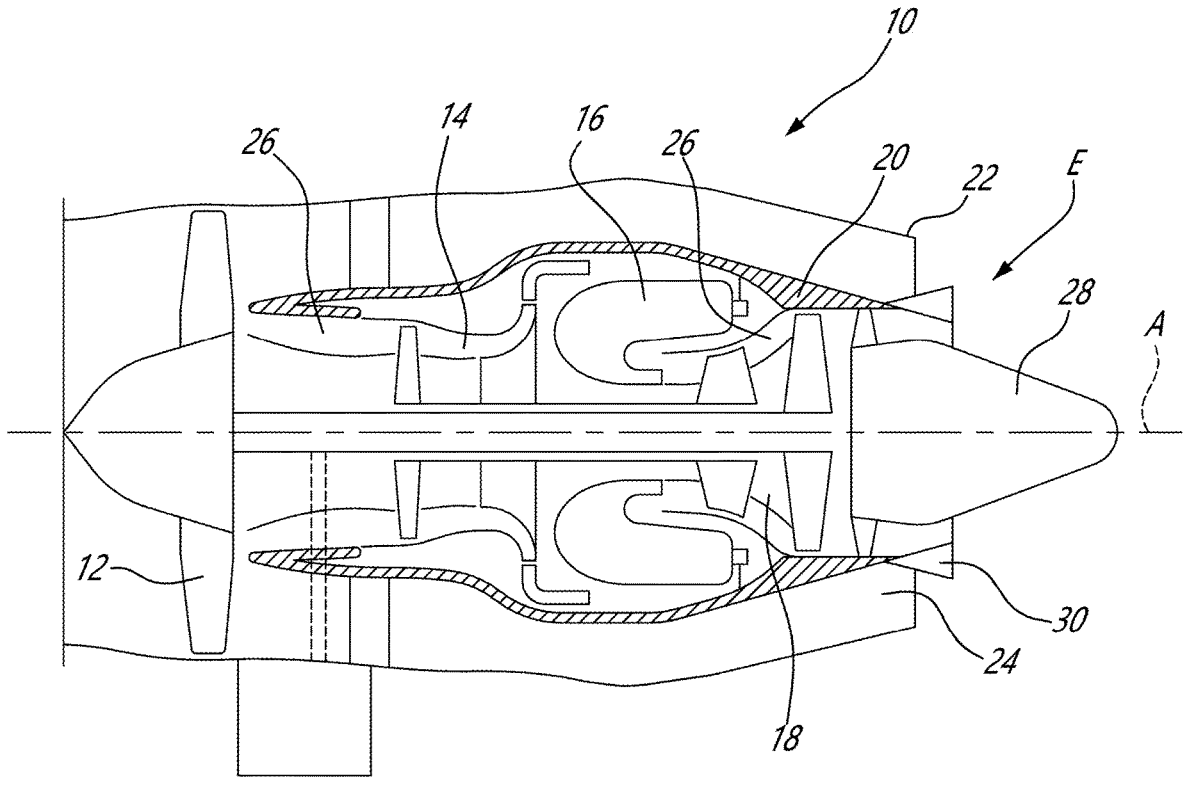
FIG. 1 is a schematic cross-sectional view of a turbine engine.

FIG. 1 illustrates an aircraft turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The engine 10 includes a first, inner casing 20, or core casing 20, which encloses the core turbo machinery of the engine 10, and a second, outer casing 22, or nacelle 22, extending outwardly of the first casing 20 so as to define an annular bypass flow passage 24 therebetween. The air flow propelled by the fan 12 is split into a first portion which flows around the first casing 20 within the bypass flow passage 24, and a second portion which flows through a core flow passage 26 which is defined within the first casing 20 and allows the flow to circulate through the compressor section 14, the combustor 16 and the turbine section 17 as described above.

At the aft end of the engine 10, an axisymmetric bullet 28 is centered on an axis A of the engine 10 and defines an inner wall of the core flow passage 26 so that the combustion gases flow therearound. A multi-lobed exhaust mixer 30 (or simply "mixer") surrounds at least a portion of the bullet 28, the mixer 30 acting as a rearmost portion of the outer wall defining the core flow passage 26 and a rearmost portion of the inner wall defining the bypass flow passage 24. The bullet 28 and the mixer 30 may be said to form part of an exhaust section E of the engine 10. The hot combustion gases from the core flow passage 26 and the relatively cooler air from the bypass flow passage 24 are thus mixed together by the mixer 30 at the exit thereof so as to produce an exhaust flow having a reduced temperature relative to that of the combustion gases inside the core flow passage 26 immediately outside the combustor 16.

Figure 2:
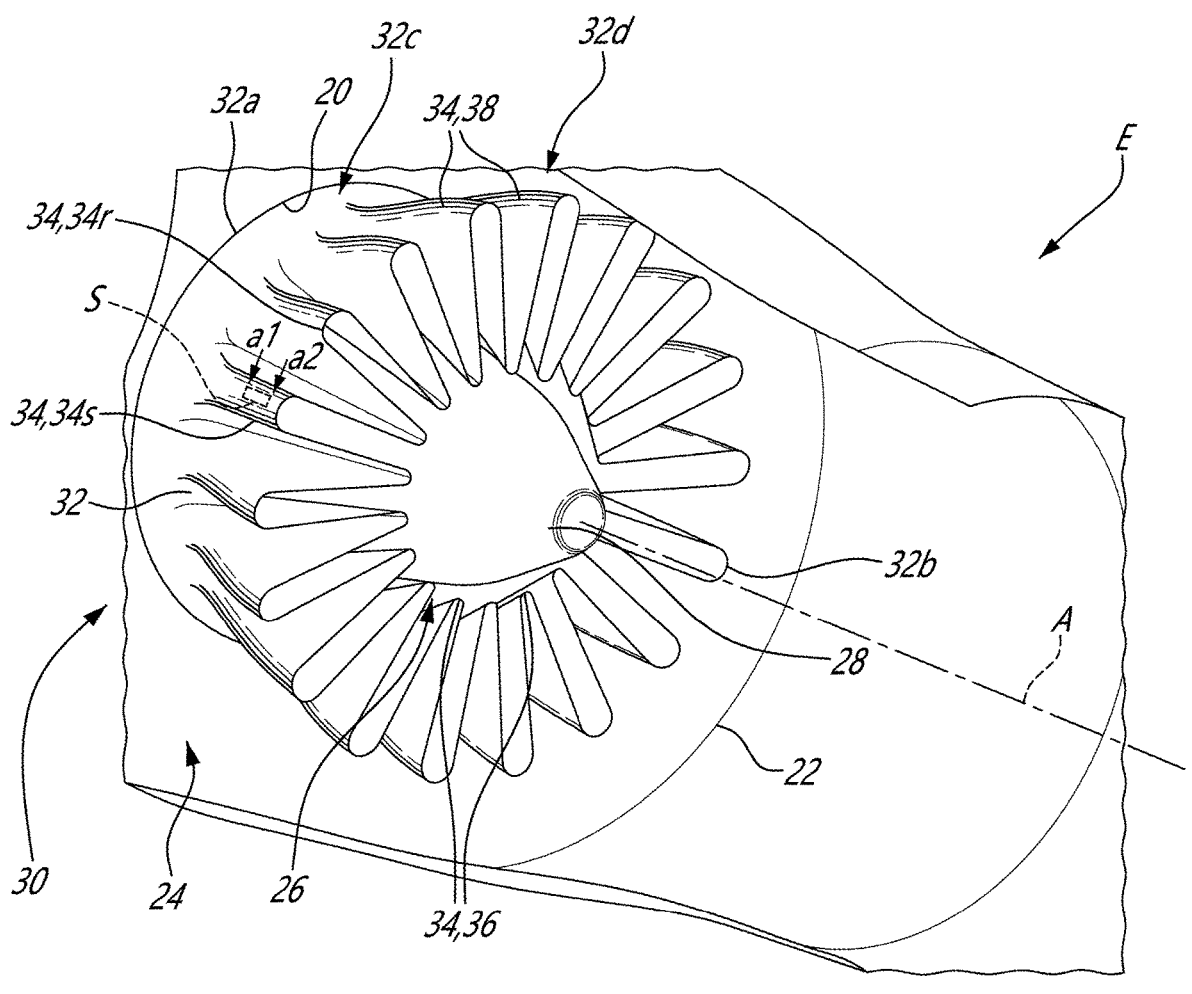
FIG. 2 is a perspective view of portions of an exhaust section of the turbine engine of FIG. 1.

Referring to FIG. 2, the mixer 30 includes a peripheral wall 32 having a leading edge 32a and a trailing edge 32b spaced axially away from the leading edge 32a relative to the axis A. The leading edge 32a is a foremost peripheral contour of the mixer 30. At least in some embodiments, the leading edge 32a is defined by a mounting flange of the mixer 30 that may or may not be integral to the peripheral wall 32. At or near the leading edge 32a, the mixer 30 is mounted to an aft portion of the first casing 20 referred to as a turbine exhaust case. The mixer 30 can thus be described as the last stage of the turbine exhaust case. The trailing edge 32b is a rearmost peripheral contour of the mixer 30. The peripheral wall 32 defines a plurality of lobes 34 that are circumferentially spaced apart from one another relative to the axis A. The peripheral wall 32 thus has, at least at some axial locations relative to the axis A, a peripheral contour that defines alternating valleys 36 (i.e., circumferentially-spaced radially inner portions of the peripheral contour) and crests 38 (i.e., circumferentially-spaced radially outer portions of the peripheral contour).

Figure 3A:
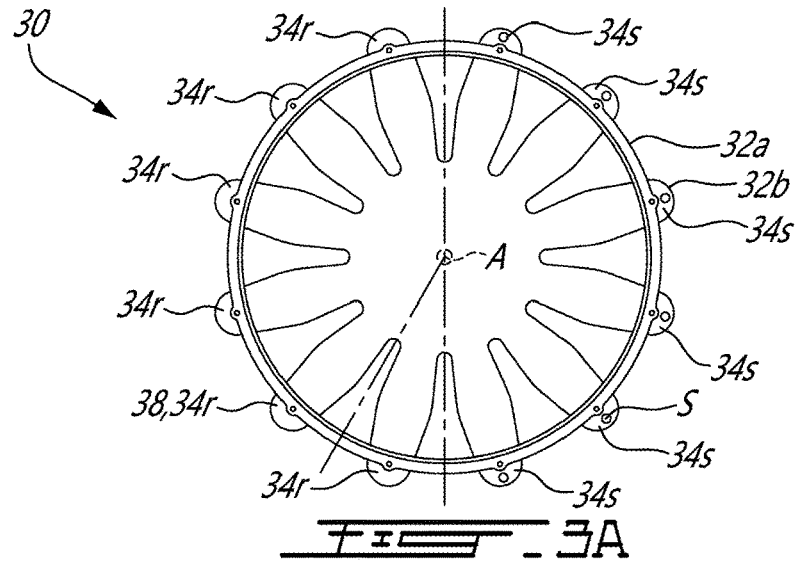
FIGS. 3A-3C are elevation views of exhaust mixers according to embodiments.
Figure 3B:
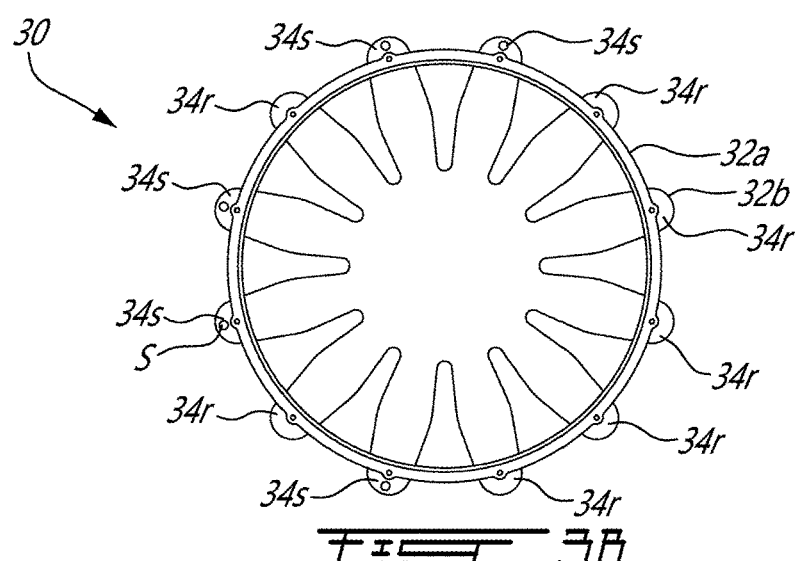
Figure 3C:
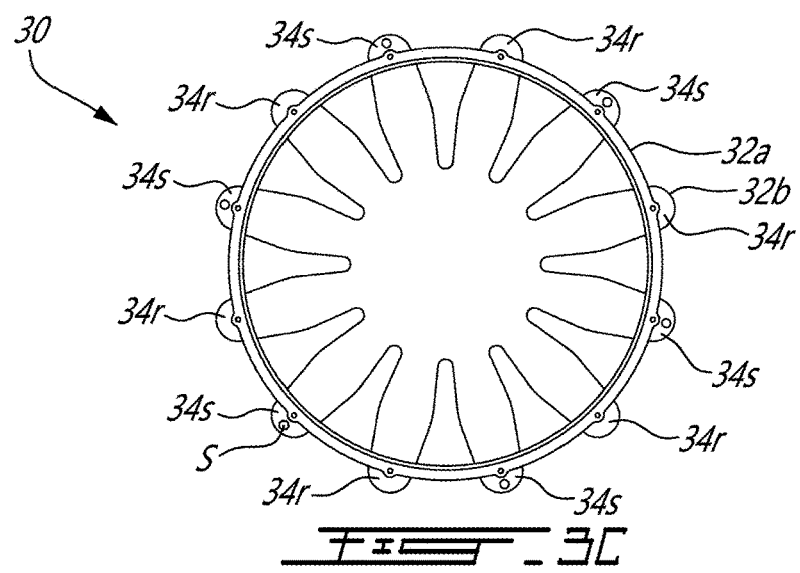

Depending on the implementation, various geometrical parameters of the mixer 30 can be set so as to optimize performance such as dimension(s) (e.g., length, diameters at the leading edge 32a, diameters at the trailing edge 32b, etc.) but also shape(s). Various peripheral profiles are contemplated for the mixer 30. At least some of the valleys 36 and/or at least some of the crests 38 have a lobed shape, i.e., are lobes 34. Lobed valleys 36 and lobed crests 38 can respectively be referred to as inner lobes 36 and outer lobes 38. In certain embodiments, all of the valleys 36 are lobed. In certain embodiments, all of the crests 38 are lobed. In embodiments including those depicted in the Figures, all of the valleys 36 and all of the crests 38 are lobes 34. Stated otherwise, in the depicted embodiments all of the valleys 36 are inner lobes 36, and all of the crests 38 are outer lobes 38. As shown in FIGS. 3A-3C, the valleys 36 can be located, at least in part, radially inward of the leading edge 32a relative to the axis A, and the crests 38 can be located, at least in part, radially outward of the leading edge 32a relative to the axis A. The peripheral profile of the mixer 30 may also be described relative to the bypass flow passage 24 and the core flow passage 26. For example, in the depicted embodiments and as best seen in FIG. 2, the inner lobes 36 extend radially inwardly relative to an outer boundary of the core flow passage 26, and thus impinge on the flow exiting the core flow passage 26. The outer lobes 38 extend radially outwardly relative to an inner boundary of the bypass flow passage 24, and thus impinge on the flow exiting the bypass flow passage 24. Various cross-sectional profiles are contemplated for the mixer 30. As the inner lobes 36 and the outer lobes 38 extend toward the trailing edge 32b, they may define a linear profile (e.g., as shown in the embodiments depicted in FIGS. 4A-4E), a curved profile or a combination of one or more linear profile(s) and/or curved profile(s). At the trailing edge 32b, the mixer 30 may define a linear profile (e.g., FIGS. 4A-4C), a chevron profile (e.g., FIG. 4D) or a curved profile (e.g., FIG. 4E).

The geometry of the mixer 30 impacts the dynamic response of the mixer 30 as the engine 10 operates. Indeed, engine operation generates vibration which affects even static components such as the mixer 30. Asymmetrical mass distribution in rotating components, component wear, foreign object impact, and aerodynamic forces are among causes of engine vibration. The mixer 30 is characterized by natural vibration frequencies depending on the stiffness and mass distribution of the mixer 30, with each natural frequency being associated with a different mode shape. In any mode shape, some portions of a vibrating structure move, whereas others, referred to as nodes, generally do not. In a given mode shape for a component having a periodic rotational symmetry such as the mixer 30, the component may exhibit nodes (whether point(s), line(s) and/or circle(s)) that conform to the periodic rotational symmetry. During engine operation at a regime within the standard operating range, if the engine 10 produces, at the mixer 30, an excitation vibration that corresponds to a natural frequency of the mixer 30, local displacement(s) of the mixer 30 of a significant amplitude and consistent with the corresponding mode shape can occur, which is undesirable.

The present technology thus provides mixers 30 that are structurally arranged for attenuating the amplitude of displacement associated with certain mode shapes thereof, i.e., that are provided with discrete structural features for breaking undesirable mode shape(s), i.e., for preventing resonant vibration. This may be achieved by locally stiffening, and thus locally hindering deformation, of the mixer 30, at circumferentially spaced apart peripheral locations of a same axial location of the mixer 30. At least in some embodiments, these peripheral locations are selected so as to be consistent with the locations of line nodes, also known as nodal diameters, of the mode shape(s) that are to be broken. At least in some embodiments, each of these peripheral locations respectively corresponds to a discontinuity in the peripheral wall 32 of the mixer 30 that is absent from other so-called non-stiffened peripheral locations of the mixer 30 at the same axial location. As will become apparent from the forthcoming, such discontinuities, when present, may impart a localized increase in stiffness to the mixer 30.

Hence, the mixer 30 has a first mixer portion (for example a crest of a first lobe 34s, see FIGS. 3A-3C) and a second mixer portion (for example a crest of a second lobe 34r, see FIGS. 3A-3C) that are circumferentially spaced apart and extend away from the leading edge 32a from a first axial location a1 to a second axial location a2 (see FIGS. 4A-4E) relative to the axis A. Stated otherwise, the first and second mixer portions are limited to a given axial range of the mixer 30. The first and second mixer portions respectively have a first mixer stiffness and a second mixer stiffness. The first mixer stiffness is greater than the second mixer stiffness and than a stiffness of an upstream portion of the peripheral wall 32 extending from the first mixer portion at the first axial location toward the leading edge. In embodiments, the first mixer portion and the second mixer portion are located at a same radial distance from the axis A. The circumferential distance between the first and second mixer portions may thus correspond to a multiple of the circumferential distance between consecutive lobes 34. By limiting the first mixer portion, i.e., the stiffened portion, to a given axial range of the mixer 30 affected by a problematic mode shape, this mode shape can be broken with little detriment to design considerations (e.g., cost of manufacturing and/or overall weight of the mixer 30).

Referring to FIGS. 3A-3C, exemplary implementations of the mixer 30 in which at least one lobe 34 is locally stiffened will now be described. The mixer 30 has a plurality of lobes 34 which may vary in number depending on the implementation. In each of the implementations depicted in FIGS. 3A-3C, the mixer 30 is provided with 12 inner lobes 36 and 12 outer lobes 38. Within a given axial range of the mixer 30 relative to the axis A (i.e., between the first axial location a1 and the second axial location a2, see FIGS. 4A-4E), at least one lobe 34 has a stiffened portion S. In some embodiments, at least 25% of the lobes 34 have a stiffened portion S, i.e., have one of the first mixer portions. In other embodiments, at least 50% of the lobes have a stiffened portion. Lobes 34 having a stiffened portion S in the axial range may be referred to as stiffened lobes 34s, whereas lobes 34 that are not provided with a stiffening portion S in that same axial range may be referred to as regular lobes 34r. Although stiffened portions S are in these cases disposed at the crest of outer lobes 38, it should be noted that depending on the implementation, other locations may be suitable for stiffening a lobe 34.

In FIG. 3A, there is shown an implementation of the mixer 30 in which half of the lobes 34, namely consecutive lobes 34, are provided with a stiffened portion S, and are thus stiffened lobes 34s. Conversely, a remainder of the lobes 34, in this case half of the lobes 34 being consecutive lobes 34, are regular lobes 34r. Depending on the implementation, consecutive stiffened lobes 34s may be located on an outboard side of the mixer 30, on an inboard side of the mixer 30, on a top side of the mixer 30 or on a bottom side of the mixer 30.

In FIG. 3B, there is shown another implementation of the mixer 30 in which stiffened lobes 34s are aperiodically distributed relative to the axis A. For instance, as shown, pairs of consecutive stiffened lobes 34s may be spaced from one another by one or more regular lobes 34r.

In FIG. 3C, there is shown another implementation of the mixer 30 in which stiffened lobes 34s are periodically distributed relative to the axis A. Stated otherwise, a repeating pattern of stiffened lobe(s) 34s and regular lobe(s) 34r is defined. For instance, as shown, each stiffened lobe 34s can be located between two regular lobes 34r. Stated otherwise, each one of the first mixer portions is circumferentially interspaced between two consecutive ones of the second mixer portions.

Turning now to FIGS. 4A-4E, various axial locations at which stiffened portion(s) S may be provided, and possible characteristics of such stiffened portion(s) S will now be described. In general, each stiffened portion S has a certain length defined axially relative to the axis A, and thus extends from a first axial location a1 to a second axial location a2, the first axial location a1 being relatively closer to the leading edge 32a and the second axial location a2 being relatively closer to the trailing edge 32b. Each stiffened portion S is also peripherally interrupted, i.e., does not define a closed peripheral contour of the mixer 30. As such, within the first and second axial locations a1, a2, the mixer 30 has at least a first mixer portion that is relatively stiffened (and thus corresponds to a stiffened portion S) and a second mixer portion absent stiffening, that are circumferentially spaced apart. The first mixer portion thus has a first mixer stiffness that is greater than a second mixer stiffness of the second mixer portion. Each stiffened portion S is also axially interrupted, i.e., has a stiffness that is greater relative to that of a portion of the mixer 30 immediately upstream thereof. Stated otherwise, each stiffened portion S is stiffer than a so-called upstream portion of the mixer 30 adjacent thereto and extending from the first axial location a1 toward the leading edge 32a. In this manner, the stiffened portion S can be located anywhere between the leading edge 32a and the trailing edge 32b, so long as it is spaced away from the leading edge 32a.

Depending on the implementation, stiffened portion(s) S may be located in an annular portion 32c of the mixer 30 that extends between the leading edge 32a and the lobes 34 (FIG. 4A), in a lobed portion 32d of the mixer 30 that defines the lobes 34 between the annular portion 32c and the trailing edge 32b (FIGS. 4B, 4C, 4E), and/or may extend across a boundary common to the annular portion 32c and the lobed portion 32d (FIG. 4D).

In some implementations, the stiffened portion S has a thickness St that is greater than a thickness 30t of the mixer 30 taken at an upstream axial location relative to the stiffened portion S (i.e., at a location adjacent to the stiffened portion S between the leading edge 32a and the stiffened portion S, see FIG. 4A for example). Depending on the implementation, the stiffened portion S can protrude inwardly relative to an inner surface of the mixer 30 at the upstream axial location and/or outwardly relative to an outer surface of the mixer 30 at the upstream axial location. In some implementations, the stiffened portion S comprises a portion of the peripheral wall 32 of the mixer 30 and one or more additional layers of material, which may be referred to as a stiffener, suitably affixed to the peripheral wall 32 via its inner surface or its outer surface. In some embodiments, the stiffener may has a thickness that is greater than that of the underlying peripheral wall 32. In some implementations, the mixer 30 forms a unitary piece, i.e., the stiffened portion S is manufactured integrally with the portions of the mixer 30 adjacent thereto, for example by subtractive or additive manufacturing method(s). In some implementations, the stiffened portion S, or first mixer portion, is manufactured so as to have a higher density relative to that of the mixer 30 at the upstream axial location. In other embodiments, the stiffened portion S, or first mixer portion, is strain hardened or is formed from a different material so as to be stiffer than the second mixer portion.

In FIG. 4A, the annular portion 32c of the peripheral wall 32 is provided with at least one stiffened portion S, or first mixer portion. Depending on the embodiment, the stiffened portion(s) S may be closer to the lobed portion 32d than to the leading edge 32a.

In FIGS. 4B and 4C, the lobed portion 32d is provided with at least one stiffened portion S, i.e., at least one first mixer portion. Depending on the embodiment, the stiffened portion(s) S may be closer to the trailing edge 32b than to the annular portion 32c. Depending on the embodiment, the stiffened portion(s) may be provided in outer lobe(s) 38 (FIG. 4B) and/or in inner lobe(s) 36 (FIG. 4C).

In FIG. 4D, the peripheral wall 32 is provided with at least one stiffened portion S, or first mixer portion, that extends from the annular portion 32c to the lobed portion 32d. Whereas the embodiments of the mixer 30 depicted in FIGS. 4A-4C have a trailing edge 32b defining a straight profile, the trailing edge 32b of the mixer 30 of FIG. 4D defines a chevron-type profile. Other types of trailing edge profiles, such as curved (see FIG. 4E) are contemplated.

In FIG. 4E, the lobed portion is provided with at least one stiffened portion S, i.e., at least one first mixer portion, that in this case is defined by a lobe 34 that is cut back at the trailing edge 32b. Thus, the first mixer portion defines the trailing edge 32b between the first axial location a1 and the second axial location a2. The first and second mixer portion (s) may be said to respectively define first and second arcuate profiles at the trailing edge 32b. Due to the cut back, a rise of the first arcuate profile is greater than that of the second arcuate profile for a same span at the second axial location a2, thereby imparting the first mixer portion with a stiffness that is increased relative to that of the second mixer portion. The cut back may be straight, i.e., the first arcuate profile may lay in a notional plane, so as to define an obtuse angle α relative to the crest of the corresponding lobe 34. The cut back is in this case defined in an outer lobe 38 although it is contemplated that cut back(s) may also be provided in inner lobe(s) depending on the embodiment.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine comprising:

an engine casing housing a core of the aircraft engine, the engine casing extending circumferentially about an axis of the aircraft engine and defining a core flow passage therewithin;

a nacelle located radially outward from and circumferentially around the engine casing, a bypass flow passage radially defined between the nacelle and the engine casing; and a mixer mounted to the engine casing, the mixer including a peripheral wall having a leading edge attached to the engine casing and a trailing edge axially spaced from the leading edge and extending around the axis, the peripheral wall including a lobed portion defining lobes that are circumferentially spaced apart and that terminate at the trailing edge, the peripheral wall including a lobeless annular portion upstream of the lobed portion and, wherein a first mixer portion and a second mixer portion are circumferentially spaced apart and respectively extend away from the leading edge from a first axial location to a second axial location, the first mixer portion at least partially including a first lobe of the lobes and the second mixer portion at least partially including a second lobe of the lobes;

wherein the peripheral wall of the first lobe includes a stiffener at a location of line nodes of the mixer, the stiffener being a discrete feature configured to attenuate resonant vibration of the mixer, the stiffener imparting a localized increase in stiffness relative to the second lobe that is free of the stiffener and has a lower stiffness than the first lobe, wherein the mixer is rotationally asymmetrical about the axis and has an asymmetrical mass distribution about the axis for attenuating the resonant vibration of the mixer; and wherein the stiffener has a thickness that is greater than a wall thickness of the lobeless annular portion of the mixer upstream of the stiffener, the stiffener having an axial length extending from the first axial location to the second axial location downstream of the first axial location, the thickness of the stiffener being less than the axial length thereof, and the stiffener comprises one or more additional layers of the peripheral wall to define the thickness that is greater than a wall thickness of the lobeless annular portion of the mixer upstream of the stiffener.

2. The aircraft engine of claim 1, wherein the stiffener of the first mixer portion has a first thickness and the second mixer portion has a second thickness, the first thickness being greater than the second thickness.

3. The aircraft engine of claim 1, wherein the thickness of the stiffener is greater than that of the peripheral wall of the first mixer portion.

4. The aircraft engine of claim 1, wherein the first mixer portion and the second mixer portion are respectively located at a crest of the first lobe of the lobes and at a crest of the second lobe of the lobes.

5. The aircraft engine of claim 1, wherein the first mixer portion is one of a plurality of the first mixer portions having a stiffness equal to or greater than the stiffness of the stiffener.

6. The aircraft engine of claim 4, wherein at least 25% of the lobes have one of a plurality of the first mixer portions.

7. The aircraft engine of claim 4, wherein the second mixer portion is one of a plurality of the second mixer portion having a stiffness that is lower than the stiffness of the stiffener, and each one of a plurality of the first mixer portions is circumferentially interspaced between two consecutive ones of the plurality of the second mixer portions.

8. The aircraft engine of claim 1, wherein the first mixer portion and the second mixer portion are located at a same radial distance from the axis.

9. The aircraft engine of claim 1, wherein the first mixer portion corresponds to a portion of the trailing edge extending between the first axial location and the second axial location.

10. The aircraft engine of claim 1, wherein the stiffener has a greater density than the second mixer portion.

11. The aircraft engine of claim 1, wherein the stiffener is strain hardened or is formed from a different material so as to be stiffer than the second mixer portion.

12. The aircraft engine of claim 1, wherein the stiffener extends axially across a boundary defined between the lobeless annular portion and the lobed portion of the mixer.

13. The aircraft engine of claim 1, wherein at least a portion of the stiffener protrudes radially inwardly from an inner surface of the peripheral wall of the mixer.

* * * * *